Figure 1:
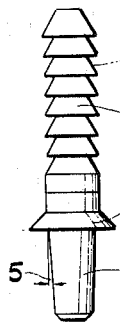

United States Patent
Holz

[11] 3,810,341
[45] May 14, 1974

[54] MULTIPART JOINING ELEMENT FOR BUTT AND CORNER JOINTS

[76] Inventor: Heinrich Holz, CH-8841 Egg/SZ, Switzerland

[22] Filed: June 10, 1971

[21] Appl. No.: 151,879

[30] Foreign Application Priority Data
June 12, 1970 Switzerland.......................... 8760/70

[52] U.S. Cl.................. 52/753 E, 52/585, 403/292, 36/67 D
[51] Int. Cl.......................... F16b 13/06, F16b 2/00
[58] Field of Search...... 287/20.92 E, 127 R; 85/14, 85/42; 52/585; 36/67 D

[56] References Cited
UNITED STATES PATENTS

| | | | |
|---|---|---|---|
| 3,129,472 | 4/1964 | Hensel | 287/20.92 E |
| 3,473,433 | 10/1969 | Mayr | 85/14 X |
| 2,257,001 | 9/1941 | Davis | 287/20.92 E X |
| 115,214 | 5/1871 | Jones | 287/20.92 E |
| 1,455,793 | 5/1923 | Kindt | 287/20.92 E |
| 2,221,141 | 11/1940 | Kindt | 287/20.92 E |
| 2,677,160 | 5/1954 | Peterson | 287/20.92 E |
| 3,352,191 | 11/1967 | Crawford | 287/20.92 E |
| 3,527,486 | 9/1970 | Gamp | 287/20.92 E |

FOREIGN PATENTS OR APPLICATIONS
144,989 10/1903 Germany...................... 287/20.92 E Primary Examiner—Jordan Franklin
Assistant Examiner—Wayne L. Shedd

[57] ABSTRACT

A joining or fastening element for use on butt and corner joints for furniture and cabinets of wood or like material, including a plug portion to be anchored in one of the members to be joined, and a sleeve to be anchored in the other member to be joined. One end of the plug portion terminates in a projecting conical configuration. The sleeve is flexible with respect to and serves as a seat for the projecting cone end of the plug portion.

13 Claims, 9 Drawing Figures

PATENTED MAY 14 1974 3,810,341

INVENTOR
HEINRICH HOLZ
BY

MULTIPART JOINING ELEMENT FOR BUTT AND CORNER JOINTS

The invention deals with the joining of wall parts of furniture, shelves and the like consisting of wood or a wook-like material, the aim being to be able to make invisible butt joints and corresponding corner joints by simply putting the parts together.

Corner and butt joints are made in the most varied manners in the furniture industry. Non-detachable joints made by means of gluing which are known to be very time-wasting, especially when they are made with glued wooden dowels or plugs, are known in particular. The disadvantage of these known joints, resulting from the gluing process, is the long setting time with all types of glue and hence the associated waiting time.

The manifold, known types of metal fitting for detachable joints, particularly corner joints, exhibit disadvantages such as involved and hence expensive manufacture and handling, the required screwing and tightening as well as the visibility of the fittings on the inside or outside. As a rule, they are namely so designed that they are accessible from the inside or outside of the joint so that they can be tightened or loosened with the aid of screw drivers, pointed awls, screw spanners and similar tools.

The object of the invention is to create a joint with which parts of preferably furniture, shelves, racks and the like consisting of constructions made of wall parts can be so joined together that these joints are simple to make, tightly-jointed and durable, invisible from inside and outside and detachable again in a simple manner.

This task is solved by the invention with a multipart joining element for butt and corner joints for wall parts of furniture, shelves and the like consisting of wood or a wood-like material, an invention which is characterised by a plug part to be anchored in a wall part and terminating in a cone and by a sleeve to be anchored in the other wall part and serving as a plug seat consisting of a material which is elastic compared with the cone. In this case, the cone can preferably consist of metal and the sleeve of an elastic plastic material.

Cone joints such as the Morse joints used on drilling machines among other things for housing the drill chucks have been known in the metal industry for a long time and the strength of such Morse joints has proven reliable for a long time in practice. However, the joining of a metal hollow body provided with a conical hole to a counterpart shaped conically on the outside is bound by the fact that only one invariable, fixed fastening point is available. There is no possibility of "tightening" or "re-tightening" it in the axial direction and that is the reason why such a joint is not suitable for joining pieces of wood together tightly, as is required of corner joints on furniture.

In contrast, the object of the invention is a multi-part joining element, the plug part of which exhibits a conically designed head and an anchoring base which serves to form a joint with a wall part and to which a plug seat to be fastened in the other wall part belongs as the counterpart, a plug seat whose conical recess corresponds to the cone on the plug part and the difference between it and the known cone joints consists in the fact that the plug seat consists of a more yielding material than the cone, e.g., a suitable plastic.

Owing to the use of materials differing in hardness and elasticity, independence is obtained from a given position which alone ensures a firm joint and this creates the possibility of guaranteeing the withdrawal strength at various phases of the joining process so that corner joints for example, as well as butt joints, can be made tight at all events.

Figure 4:
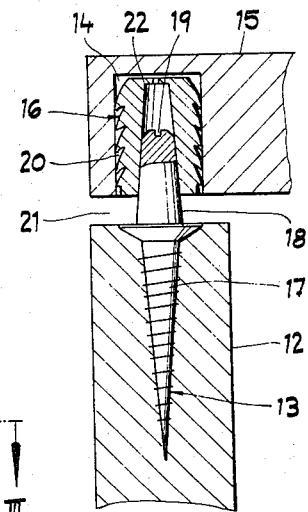
Figures 5, 6:
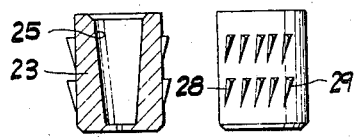
Figure 2:
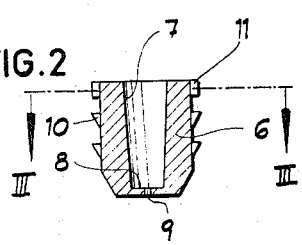
Figure 3:
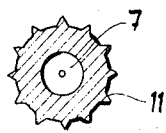
Figure 7:
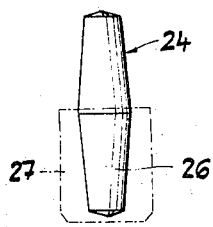
Figure 8:
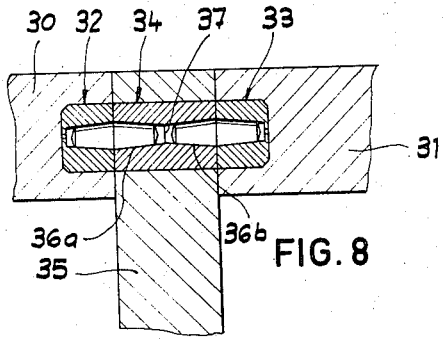

The principle and the mode of action of the invention are represented in the drawing and the invention is explained below with reference to said drawing which shows:

FIG. 1 the side view on an enlarged scale of the plug part of a joining element according to the invention, FIG. 2 a vertical section of a plug seat of a joining element according to FIG. 1, the scale being the same as in FIG. 1, FIG. 3 a horizontal section of the object according to FIG. 2, FIG. 4 a horizontal section of a not yet completely finished corner joint, made with a joining element according to the invention and of a type modified compared with the embodiment according to FIGS. 1 to 3, FIG. 5 the vertical section of a sleeve for a joining element according to the invention and of a further-modified form, FIG. 6 a side view of a sleeve according to FIG. 5, FIG. 7 a plug part for a joining element according to FIGS. 5 and 6, FIG. 8 an embodiment of a plug seat for so-called partition wall joints, derived from the embodiment according to FIGS. 5 to 7, FIG. 9 a magazine strip, e.g., of sleeves according to FIGS. 2 and 5 and roughly on a natural scale.

In FIG. 1 which represents the side view of an embodiment of a plug part of a joining element according to the invention, 1 is a conically shaped head and 2 an anchoring base coaxial to the cone and serving fastening purposes in a wall part, e.g., of a piece of furniture. A plate-type limiting part 3 which determines and fixes the depth of penetration of the anchoring base can be provided between the head 1 and the base 2. The embodiment illustrated in FIG. 1 serves to be knocked or pressed into a hole made beforehand in the relevent wall part and to this end the anchoring base 2 is equipped with sawtooth-shaped lips 4 all the way round. However, the plug part can naturally also be screwed in mechanically and, as the case may be, automatically into the wall part if the base is provided with a corresponding thread to suit the individual requirements, e.g., a normal metal thread, coarse thread or pressboard thread.

According to the values approved as suitable, the conicity 5 should amount to roughly 1.2 to a maximum of 7°, depending upon the desired or required withdrawal strength, the withdrawal strength being greater, the smaller the angle is.

The plug seat serving as the counterpart of the plug part according to FIG. 1, a counterpart which completes the joining element according to the invention, is illustrated in the form of a sleeve 6 in an embodiment in FIGS. 2 and 3. According to the invention the sleeve body consists of a material which is softer, more yielding and more elastic than the cone 1. The entire plug part or the cone may consist for example of a thermosetting plastic or metal, whereas the sleeve will consist of a shrinkage-free thermoplastic of suitable toughness.

The sleeve 6 exhibits a coaxial recess 7 extending along the major part of its length, matched to the conicity of the head 1 of the plug part, yet somewhat smaller in diameter and conical, a recess 7 into whose bottom 8 at least one opening 9 discharges through which the air which is compressed when the plug part is inserted can escape.

The reference number 10 denotes tooth-shaped anchoring cams distributed around the periphery and height and the number 11 designates any possibly provided additional, star-shaped locking cams which serve to strengthen even more the sleeve body inserted in a hole.

A so-called corner joint made with a joining element according to the invention is illustrated in FIG. 4 shortly before it is finally completed, i.e., before the two wall portions to be joined are put together to form a tight joint. Here, the plug part denoted generally by 13 is inserted in one wall part 12 and the plug seat denoted generally by 16 is inserted in a hole 14 in the other wall part 15.

In the case of this embodiment the anchoring base 17 is designed in the form of a normal wood screw thread and the function of the plate-shaped limiting piece 3 can also be identified which is appropriate particularly for joining wall parts of soft wood, veneered pressboards with a soft intermediate layer, etc. The end plane of the cone 18 is provided with a screw slot 19. Naturally, the plug part can also be inserted in the part 12 with the aid of an automatic inserter provided with a corresponding conical recess and the screw slot can then be omitted, should this be scheduled for mass production.

In the case of the example represented in FIG. 4 the plug seat differs from the embodiment according to FIGS. 2 and 3 in that it exhibits, similarly to the base 2 of the plug part according to FIG. 1, surrounding, wedge or sawtooth-shaped locking lips 20 for fastening purposes in the hole 14 instead of anchoring cams.

The gap or space 21 illustrates the so-called "zero position" of the parts 12 and 15 to be joined, for example the side wall and the bottom of a piece of furniture, i.e., the position where a withdrawal strength effect does not yet occur. When the cone 18 is pressed further into the conical recess 22 in the sleeve 16 or the sleeve is pressed onto the cone 18, the elastic sleeve begins to exert an adhering effect on the non-elastic cone and the withdrawal strength hence begins to build up and increases until the joint is tight. It is thus possible, this being very convenient for alignment and adjustment, to join one wall part to another by pressing or knocking them together lightly and only to the extent that they do in fact retain the mutual, desired position, yet can be detached again easily.

A further possibility of designing a joining element according to the invention is illustrated with the individual parts in FIGS. 5 to 7. In the case of this embodiment use is made of two identical sleeves 23 which are provided with a recess 25 matched to the conicity of the twin cone pin 24. One of the sleeves, represented by a dash-dot line in FIG. 7, is joined firmly to the twin cone pin 24, for example by pressing it very firmly onto the cone part 26 with the aid of a machine or by means of gluing, thus causing the formation of a plug part 27 which corresponds to the representation according to FIG. 1 or part 13 in FIG. 4 and which is knocked or pressed into a prepared hole in the appropriate wall part. The counterpart in the form of a sleeve 23 is anchored in the other wall part in the same way, as shown in FIG. 4.

FIG. 6 also shows how the anchoring cams denoted by 10 in FIG. 2 can be designed so that the sleeve is caused to turn when it is driven into the hole prepared for it. To this end, said cams are shaped pointedly from the knocking-in side and become thicker starting from said point in a wedge-shape manner, one of the base edges 28 being axially parallel to one of the inclined planes, whereas the other inclined plane has a base edge 29 which is at an angle to the axis of the sleeve.

In the case of the partition wall joint according to FIG. 8, plug parts according to FIG. 7 and denoted generally by 32 and 33 are inserted in the aligned wall parts 30 and 31, although ones like those according to FIGS. 1 or 4 naturally also fulfil the same purpose. In contrast, the plug seat 34 in the partition wall 35 exhibits two axially horizontal, conical recesses 36a and 36b for housing the cones of the two plug parts 32 and 33. In the example shown the cones are provided with through-holes, i.e., have a common, very small diameter 37.

A plug seat 34 can also be used for a normal corner joint, especially when the non-utilised recess is closed with a corresponding part, e.g., an indented plastic stopper which ends in a disk. With respect to extension furniture units, shelves and the like, plug seats are then prepared for the wall parts, bottoms and the like which may be joined on.

Figure 9:
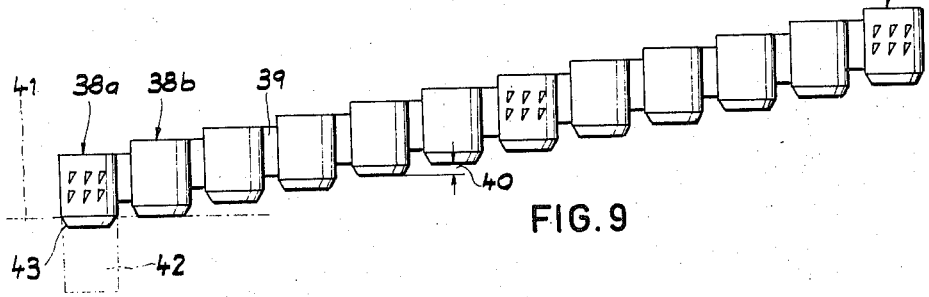

FIG. 9 shows how the individual sleeves 38a, 38b . . . 38n can be produced in multiple form, connected together by thin bridges or fins 39, by means of pressure moulding, thus leading to the formation of a magazine which facilitates storage and is convenient to handle. Here, handling is facilitated by the fact that the individual sleeves are arranged adjacent to each other in a step-shaped manner with distances 40 between the base planes. The outermost sleeve, e.g., 38a, can then be placed comfortably on the surface 41 of the wall part provided with the seating hole 42 and the remaining sleeves do not have a disturbing effect. Of course, a magazine of plug parts according to FIG. 7 can also be formed in this manner.

Magazines of this type can be used especially with known, so-called automatic inserters or firing tools driven mechanically or pneumatically and used in practice and the step-shaped design makes a considerable contribution precisely in this case toward the rapid finding of the associated hole 42 and hence toward the efficient utilisation of the automatic mechanism because the contact part 43 of the individual sleeve slides into the hole.

I claim:

1. A dowel pin assembly for the separable joining of a plurality of members comprising a longitudinally extending pin member including two mutually coaxial sections, the first section having an outer peripheral surface including means for locking reception in a bore provided in a first one of the members, the second section being conical in shape and presenting a smooth surface extending away from the first section to project outwardly from said first member, a sleeve member having an outer peripheral surface including means adapted for resiliently gripping reception in a bore provided in a second member, a smooth, conically shaped longitudinally extending recess in the sleeve member substantially corresponding in conicity with the conical section of said pin member and having an angle of from about 1.2° and about 7° with respect to the longitudinal axis thereof, and adapted for tightly receiving therein the conically shaped pin section, the sleeve member being composed of a material which is softer, more yielding and more elastic than the material of the conical pin section, such that upon insertion of the conical pin section into the conical recess the sleeve member is forcibly expanded in size by the wedging action of the pin section so as to exert a retaining frictional force on the pin section and increase the gripping force of the sleeve member within the bore thereby maintaining the members in a securely joined position while permitting separation of the joint upon the application of sufficient force in a direction to separate the pin section from the recess in the sleeve member.

2. A dowel pin assembly according to claim 1 wherein at least the conical section of the pin member consists of metal, and the sleeve member consists of a thermoplastic material.

3. A dowel pin assembly according to claim 1 wherein the means for securing the sleeve member within the bore includes a plurality of peripherally spaced radially projecting saw toothed projections on the outer peripheral surface of the sleeve member.

4. A dowel pin assembly according to claim 1 wherein the means for securing the sleeve member within the bore includes a plurality of peripherally spaced radially projecting wedge shaped projections pointed towards the outer face of the sleeve and having one longitudinal edge of each projection extending parallel to the longitudinal axis of the sleeve.

5. A dowel pin assembly according to claim 1 wherein the first section of the pin member is provided with radially extending projections for securing the pin member directly to the bore in the first member.

6. A dowel pin assembly according to claim 5 wherein the projections are peripherally spaced radially extending saw toothed projections provided on the outer peripheral surface of the first section.

7. A dowel pin assembly according to claim 5 wherein the projections are in the form of a radially extending screwthread.

8. A dowel pin assembly according to claim 5 further comprising an annular disc attached to and surrounding the pin member at the junction between the first and second pin sections.

9. A dowel pin assembly according to claim 5 wherein the first pin section is conically shaped, and a second sleeve member is lockingly received in the bore provided in the first member and having a conical recess therein adapted for tightly receiving the first conical pin section therein for joining the pin member to the first member.

10. A dowel pin assembly for the separable joining of a plurality of members comprising a first longitudinally extending pin member including two mutually coaxial sections, a first pin section being conically shaped, a first sleeve member having an outer peripheral surface including means adapted for locking reception in a bore provided in the first member, a conically shaped longitudinally extending recess in the first sleeve member adapted for tightly receiving the first conical pin section therein, the first sleeve member being of a lesser hardness and greater elasticity than the first conical pin section of the first pin member, the second section of the pin member provided with means for securing it in a bore provided in a second member to be joined to the first member, the first sleeve member further comprising a second longitudinally extending conical recess, a second longitudinally extending pin member having a first pin section being conically shaped adapted to be tightly received in the second conical recess in the first sleeve member, a second pin section on the second pin adapted for securement in a bore provided in a third member for joining the third member to the second member, the first sleeve member being of a lesser hardness and greater elasticity than the first conical pin section of the second pin member, the first and second conical recesses in the first sleeve member diverging outwardly from the center of the first sleeve member towards the ends of the first sleeve member.

11. A dowel pin assembly according to claim 10 wherein at least the conical sections of the first and second pin members each consist of a thermosetting material, and the first sleeve member consists of a thermoplastic material.

12. A dowel pin assembly according to claim 10 wherein the angle of conicity of the conical section of each of the pin members and of the corresponding conical recesses in the first sleeve member, determined at the cone apex between the longitudinal axis and the sloping cone outer wall surface, is from about 1.2° to about 7°.

13. A dowel pin assembly according to claim 8 wherein the sleeve members are in multiple form, the individual sleeve members being connected by readily separable thin fins, such that each sleeve member may be readily separated from the other sleeve members for insertion into a bore in one of the members to be joined together.

* * * * *